United States Patent
Menk et al.

(10) Patent No.: US 8,171,305 B2
(45) Date of Patent: May 1, 2012

(54) METHOD FOR AUTHORIZING A TELEPHONE TRANSACTION AND LOCAL NODE

(75) Inventors: Klaus-Dieter Menk, Hünfeldent (DE); Axel Mayer, Rosenhein (DE)

(73) Assignee: Avaya Inc., Basking Ridge, NJ (US)

( * ) Notice: Subject to any disclaimer, the term of this patent is extended or adjusted under 35 U.S.C. 154(b) by 1185 days.

(21) Appl. No.: 11/569,508

(22) PCT Filed: May 26, 2005

(86) PCT No.: PCT/DE2005/000976
§ 371 (c)(1),
(2), (4) Date: Nov. 20, 2007

(87) PCT Pub. No.: WO2005/117404
PCT Pub. Date: Dec. 8, 2005

(65) Prior Publication Data
US 2008/0195618 A1     Aug. 14, 2008

(30) Foreign Application Priority Data
May 26, 2004    (DE) .................... 10 2004 026 349

(51) Int. Cl.
*G06F 21/00* (2006.01)
*H04M 7/00* (2006.01)
(52) U.S. Cl. ........................ 713/186; 379/219
(58) Field of Classification Search .................. 713/186; 379/219
See application file for complete search history.

(56) References Cited

U.S. PATENT DOCUMENTS

| | | | | |
|---|---|---|---|---|
| 5,805,674 A * | 9/1998 | Anderson, Jr. | ............. | 379/93.03 |
| 5,806,040 A * | 9/1998 | Vensko | .................. | 704/273 |
| 6,078,807 A * | 6/2000 | Dunn et al. | ................ | 455/410 |
| 6,535,582 B1 * | 3/2003 | Harris | ................... | 379/88.01 |
| 6,804,331 B1 * | 10/2004 | Vacek et al. | .............. | 379/88.02 |
| 7,035,386 B1 * | 4/2006 | Susen et al. | .............. | 379/93.02 |
| 2003/0040339 A1 * | 2/2003 | Chang | ................ | 455/563 |
| 2004/0243514 A1 * | 12/2004 | Wankmueller | ............. | 705/40 |
| 2005/0043014 A1 * | 2/2005 | Hodge | ................ | 455/411 |
| 2005/0063522 A1 * | 3/2005 | Kim et al. | ................ | 379/88.02 |
| 2006/0034287 A1 * | 2/2006 | Novack et al. | ............ | 370/395.2 |
| 2006/0041755 A1 * | 2/2006 | Pemmaraju | .................. | 713/182 |

FOREIGN PATENT DOCUMENTS
EP           1172771           1/2002

OTHER PUBLICATIONS

PCT International Search Report dated Oct. 27, 2005, for PCT Application No. PCT/DE2005/000976.

* cited by examiner

*Primary Examiner* — Techane Gergiso
(74) *Attorney, Agent, or Firm* — Sheridan Ross P.C.

(57) ABSTRACT

The invention relates to a method for authorizing a telephone transaction and in particular an access to a database through a user in a telecommunication network, said telecommunication network comprising a user interface, an access control for the database and an authentification device, which are connected with each other over a local node in the telecommunication network, as well as to a corresponding local node. The invention is characterized in that the comparative result is output by the authentification device over the local node to the access control and the result of the comparison is communicated by the access control to the user over the local node, signals sent by the authentification device being masked.

15 Claims, 2 Drawing Sheets

METHOD FOR AUTHORIZING A TELEPHONE TRANSACTION AND LOCAL NODE

CROSS REFERENCE TO RELATED APPLICATION

Figure 1:
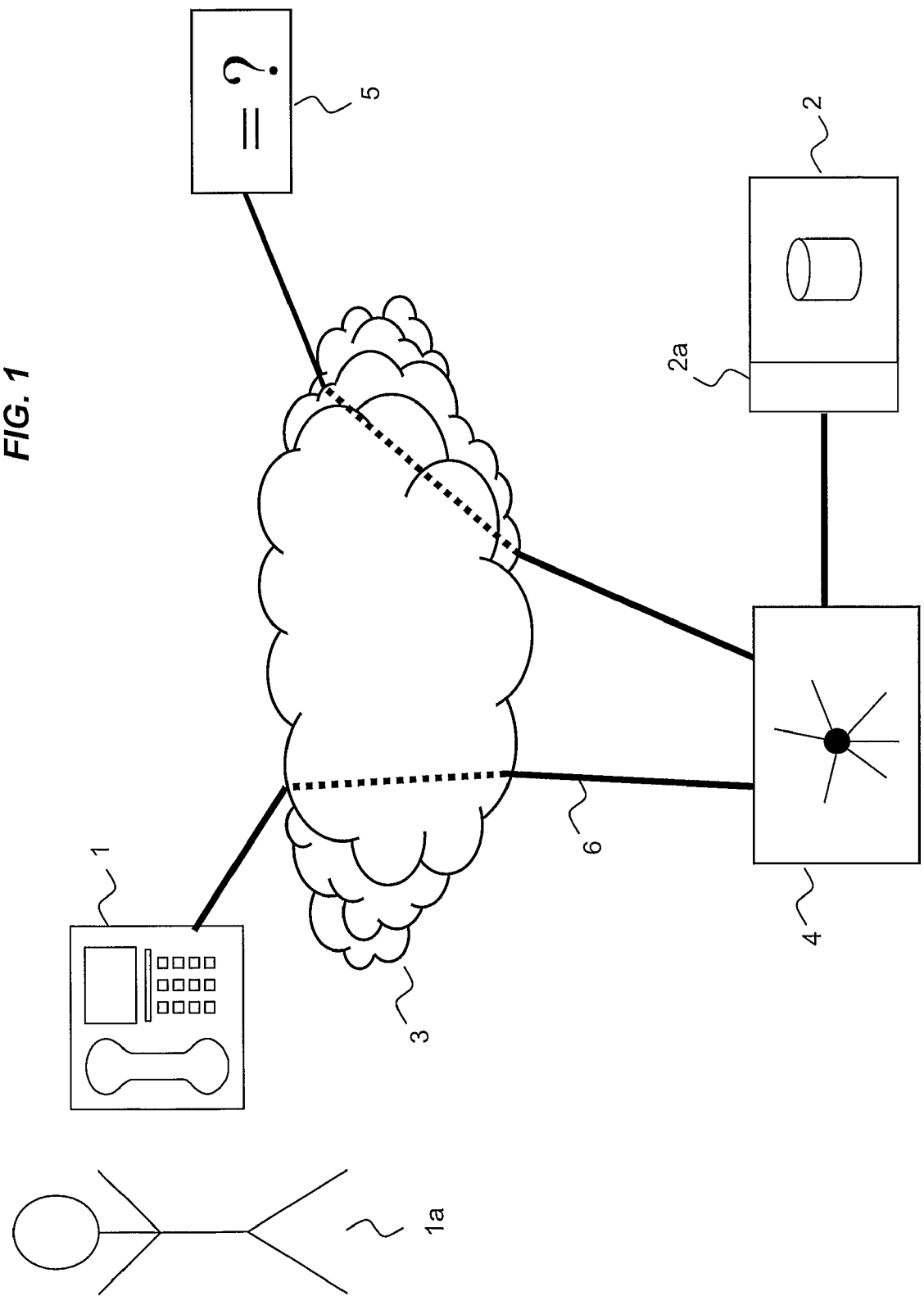

This application is a national stage application under 35 U.S.C. 371 of PCT Application No. PCT/DE2005/000976 having an international filing date of May 26, 2005, which designated the United States, which PCT application claimed the benefit of German Application Serial No. 10 2004 026 349.3, filed May 26, 2004, the entire disclosure of which is hereby incorporated herein by reference.

The invention relates to the authorization of a telephone transaction by means of voice recognition and in particular to a method for authorizing an access to information through a user, wherein the user is requested by an interactive voice device to deliver a voice sample, the voice sample is compared with a comparative data record, and the access to the desired information through the user is released by the interactive voice device as a function of the result of the comparison, as well as to a corresponding local node.

The telephone authentication by means of voice recognition is gaining more and more importance for voice dialog applications in the public telephone network. Before a user can use the service (e.g. telephone banking) of a service provider, he must identify himself. For this purpose, the service provider possesses one or more voice samples of the user. The user identifies himself in this case by entering his name or his user/access number and then repeating a voice pattern. Through comparison with the stored voice pattern, the user is identified and can then, if the result of the comparison is positive, control his transactions.

As the analysis of the voice (speaker identification or verification) requires high expenditure, a dedicated system (hereinafter referred to as authentication system) is used in most cases. There are a number of products which implement this as an independent solution and provide proprietary or VoiceXML interfaces for this purpose.

From EP 1 172 771, a method is known for authorizing a commercial transaction between a customer and a provider of goods or services through an authorization provider with authentication of the customer through comparison of a biometric sample of the customer with a biometric pattern of the customer stored with the authorization provider, the authorization process comprising the steps (a) establishment of a telephone connection over a communication network between the provider and the authorization provider via a router, the router assigning the real telephone number of the authorization provider to a virtual telephone number and transmitting the telephone number of the provider and a code which is computed simultaneously by the router and by the authorization provider with the help of the same algorithm, (b) acceptance of the telephone connection through the authorization provider, if the provider is registered with the authorization provider under the transmitted telephone number and the transmitted code corresponds to the code computed by the authorization provider, (c) transmission of an identifier serving for identifying the customer, from the customer to the authorization provider over the established telephone connection, (d) transmission of a biometric sample of the customer over the established telephone connection, (e) transmission of the amount to be transferred and any further data needed for the transaction, from the customer to the authorization provider over the established telephone connection, (f) initiation of the transaction through the authorization provider, if the correspondence between the biometric sample and the stored biometric pattern of the customer is greater than a predetermined threshold value.

A method and a device for verifying the identity of a person, using a telephone card, bank card or credit card, are known from U.S. Pat. No. 5,806,040. The system establishes a connection between the card user and a telephone network, the user entering the card number. The card number is used for access to a central database over the telephone network, a voice recognition pattern corresponding to the entered card number being loaded. The voice recognition comprises several samples of the user's voice pronouncing selected words, sentences and/or numbers. As soon as the corresponding voice recognition pattern has been loaded, the system requests the user to pronounce one of the words, sentences and/or numbers included in the voice recognition pattern. The word, sentence and/or number spoken upon the request is compared with the voice recognition pattern. If the words spoken correspond to the pattern, it is assumed that the user is authorized, and the card is released. If the words spoken do not correspond to the pattern, authorization can be denied or not be denied to the user, as a function of the use of the card and the financial frame of the card.

This type of voice dialog systems requires the provision of interfaces and a considerable expenditure of adaptation of systems to integrate the identification or verification of the speaker into their sequence of operations, the more so if a telephone system is to be retrofitted with an authentication system and/or the telephone system and the authentication system come from different manufacturers.

It is the object of the present invention to provide a method for authorizing a telephone transaction, i.e. a method with which the authorization of access to data over a public telephone network is safely guaranteed and, at the same time, the expenditure regarding the networking of user, interactive voice dialog system and authentication device is simplified. In particular, it shall be made possible in this way to retrofit already existing systems.

This object is achieved according to the invention through the method according to claim 1 and through the local node according to claim 9. Preferred embodiments of the invention are the subject matter of the dependent claims.

The method according to the invention for authorizing an access to a database through a user in a telecommunication network, said telecommunication network comprising a user interface, an access control for the database and an authentication device, which are connected with each other over a local node in the telecommunication network, and including the following steps: requesting the user, by means of the access control, to deliver a voice sample, comparing the voice sample with a comparative data record which is assigned to the user and had been stored before in a storage, by the authentication device, releasing or denying the access to the desired information through the user, as a function of the result of the comparison, by the access control, is characterized in that the result of the comparison is output by the authentication device over the local node to the access control and the result of the comparison is communicated by the access control to the user over the local node, signals sent by the authentication device being masked.

The telecommunication network is in particular an ISDN network.

In a preferred embodiment of the method according to the invention, the B-channels of the ISDN network are interconnected in such a way that in each case only that receive time slot for signals sent by the authentication device is mixed with the send time slot for signals sent to the user telephone, in which no authentication signals were received.

Preferably, the result of the comparison is transmitted in the form of DTMF sequences between the authentication device and the access control.

In a further preferred embodiment of the invention, the voice sample comprises at least one sequence of several syllables or words, the user being requested several times to pronounce a word and/or a syllable, whereby each time a voice sample is recorded, each of the several voice samples is compared with a comparative data record, whereby a hit rate is determined, and the access to the desired information through the user is released or denied by the interactive voice device as a function of the determined hit rate.

A voice filtering device for eliminating troubles in the telephone line is particularly preferred.

The masking of signals sent by the authentication device out of the signals sent by the access control for the user is in particular effected in the local node.

In a preferred embodiment of the invention, the access control is an interactive voice system.

The corresponding local node according to the invention for exchanging signals in a telecommunication network between a user telephone, an authentication device and a database for authorizing an access to a database through a user in a telecommunication network is characterized in that the signals sent by the authentication device to the access control of the database are masked out of the signals sent by the access control of the database to the user telephone.

In a preferred embodiment, the local node is an ISDN local node in which the B-channels are interconnected in such a way that in each case only that receive time slot for signals sent by the authentication device is mixed with a send time slot for the user telephone, in which no authentication signals were received.

It is particularly preferred that the local node comprises a voice filtering device to eliminate troubles in the telephone line.

One advantage of the described solution consists in the fact that no safety problems will arise, because no further interface, except the voice channel, to the existing authentication device is needed. In particular, this also excludes the possibility of wiretapping the communication between the authentication device and the database, so that fundamentally, there is no opportunity for logging signals sent by the authentication device for release/denial of access. Furthermore, with the method according to the invention and the corresponding local node according to the invention, the authentication device properly speaking can be established subsequently and at any location within the telecommunication network.

Further advantages, characteristics and features of the solution according to the invention will become clear from the following description of preferred embodiments, with reference to the enclosed drawings, in which FIG. 1 is a diagram of a system according to the state of the art for effecting a transaction over a public telecommunication network.

Figure 2:
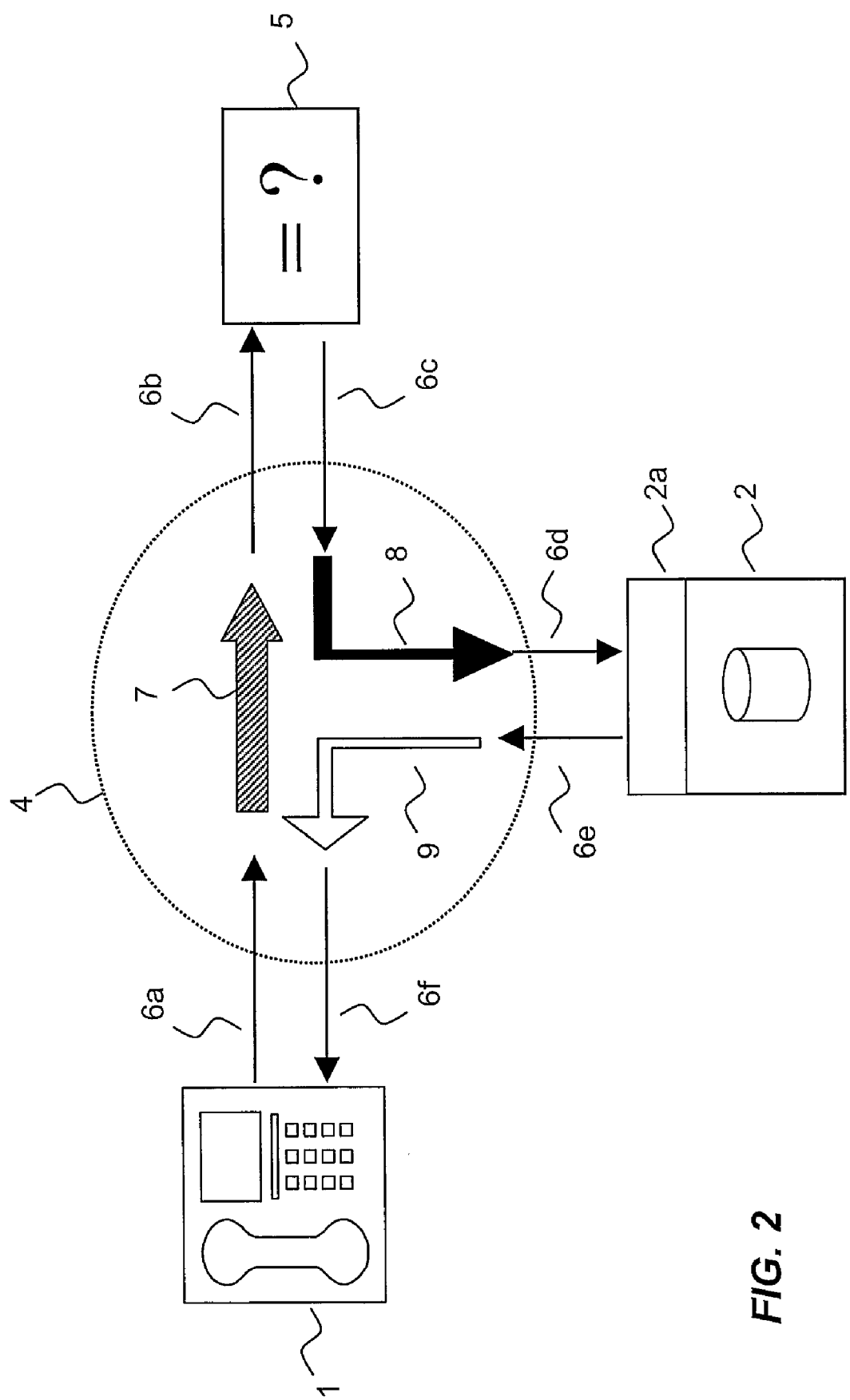

FIG. 2 is a diagram of a system according to the invention for effecting a transaction over a public telecommunication network.

In the following, a transaction over a public telecommunication network according to the state of the art will be described, in which an authentication is effected in advance, i.e. the access authorization is verified by means of an unambiguous identification of the user.

In FIG. 1, the user 1a is connected over his telephone 1 with a telecommunication network 3. Over the telecommunication network 3, he can in principle access a database 2, which is also connected with the telecommunication network 3. For the case that in this database, personal and confidential data are stored, the access to the data shall, of course, be restricted to the actually authorized persons. For this purpose, an access control 2a is connected upstream of the database 2, which verifies the authorization of the user from whom a corresponding request is received before granting him access to the data.

For the case that the user's authentication can be effected by means of a voice sample, the access control 2a returns the request of the user 1a to a local node 4, from where it is transferred to an external authentication device 5. The local node is a usual node situated inside or outside the network 3. If the telecommunication network is an ISDN network, a send time slot will be mixed in the local node 4 with a receive time slot, so that the users connected with each other can communicate with each other, like over a wire-line network. In other words, one user hears all signals generated by the two other users, there is no filtering.

In the authentication device 5, the voice sample of the user a1 is compared with comparative data, which had been stored before in a local storage (not shown) for this user. The comparative data can be correctly assigned to the user by means of an input access or identification number, which can be input either as spoken words or by entering a number. The result of the comparison is returned to the access control 2a over the same lines 6 used for transmitting the request. Then, the access control 2a either grants the user access to the database 2 or informs him that he is not authorized for access. The access control 2a can be informed by the authentication device 5 over an API (Application Programming Interface).

The access control 2a is in particular an interactive voice system, so that the user 1a can be requested by the operators of that system to repeat after them a word or syllable or number, etc., selected at random, the spoken text then being compared, as described before, in the authentication device 5 with comparative data which had been stored before.

One possible application is, e.g., a money transaction effected by a bank employee after prior authentication. The customer (caller) 1a calls, for example, his bank and is directed to a voice dialog system. The voice dialog system sets up a conference circuit with the customer and the authentication system being participants. The authentication system 5 performs the further authentication control. For this authentication, for example, a predefined sentence is requested and compared with a pattern. The authentication is acknowledged to the voice dialog system 2a through DTMF, i.e. the authentication system 5 sends defined DTMF sequences, signalling the success or failure of the authentication.

The above-described conference circuit with the user telephone 1, the local node 4, the database 2, and the authentication device 5, which are connected with each other over the network 3, involves the risk that a listener or the caller himself records the acknowledgment signals and reproduces them in the next authentication procedure in order to outwit the system and obtain access to confidential data, which otherwise would have been refused to him.

In order to exclude such a circumvention of the system, attempted with fraudulent intent, a conference circuit is set up according to the invention, in which the reply of the authentication system is exclusively received by the voice dialog system, but not by the caller himself.

By means of FIG. 2, a remote authentication will be described in the following as an exemplary embodiment of the invention.

The caller inputs over the telephone receiver or the keyboard of his telephone 1 data by means of which a connection with the access control 2a to the database 2 is established. These data can be an access number, a secret number (PIN) or a voice signal. These data are first of all transferred over the telephone network 3 to the local node 4. In the local node 4, the data required for an authentication are transferred to the authentication device 5, i.e. for example both DTMF signals entered via the keyboard of the user telephone 1 and voice signals input via the telephone receiver of the user telephone 1. It is, however, also possible to transmit only the voice signals sent by the caller to the authentication device 5. In the authentication device 5, at least some of the characteristic data sent by the caller are compared with a data record which had been stored before for this caller.

The access control 2a of the database 2 requests the user to repeat after it certain words, syllables, sentences, numbers, and the like. These voice data are sent—possibly in digitized form—either directly or by the access control 2a over the local node 4 to the authentication device 5. FIG. 2 shows an embodiment in which the data are directly sent from the user telephone 1 to the authentication device 5. In the authentication device 5, as explained above with reference to FIG. 1, the voice data are compared with sample or comparative data which had been stored before.

The result of the comparison is communicated by the authentication device 5, over the local node 4, to the access control 2a of the database 2, preferably over a standard telephone line 6 by means of a DTMF sequence. The access control 2a of the database 2 receives and analyzes the result. Then, the result is communicated by the access control of the database 2 to the user, over the local node 4 and the standard telephone line 6, over which he is connected with the local node 4. To exclude a wiretapping of the result sent by the authentication device 5, the communication to the user is, however, not effected in the form of the same DTMF signals with which the result sent by the authentication device 5 to the access control 2a of the database 2 was signalized, but, for example, in the form of voice signals—if the access control consists of a call center with personnel—or else in the form of other DTMF signals, generated, however, according to a new "alphabet", so that they differ from the DTMF sequences of the authentication device 5.

In the following, the function of the local node 4 in the method according to the invention will be described in more detail. The data flows over the line 6 in the communication of user, access control 2a, authentication device 5, and local node 4 form a closed path, namely a data flow 6a from the user telephone 1 to the local node 4, a data flow 6b from the local node 4 to the authentication device 5, a data flow 6c from the authentication device 5 to the local node 4, a data flow 6d from the local node 4 to the database 2 or its upstream interactive voice dialog system 2a, a data flow 6e from the database 2 or its upstream interactive voice dialog system 2a to the local node 4, and a data flow 6f from the local node 4 to the user telephone 1.

The data flows 6a and 6b transmit voice signals and other signals over the local node 4 from the user telephone 1 to the authentication device 5. These data are indicated by the hatched arrow 7. The data which are transmitted as data flows 6c and 6d from the authentication device 5 over the local node 4 to the interactive voice dialog system 2a, may contain the voice signals of the caller and, in addition, signals indicating the result of the comparison of the voice signals of the caller with corresponding stored samples. The latter signals are preferably DTMF signals. The data are indicated in FIG. 2 by a second, black arrow 8. In the voice dialog system 2a, the DTMF signals are filtered out by the authentication device 5, so that only "uncritical" signals remain, namely the information to the user 1a that he is allowed or not allowed to access the database 2. These message signals are sent as data flows 6e and 6f over the local node 4 to the user telephone 1.

The filtering of the DTMF signals sent by the authentication device 5 out of the signals is achieved by a corresponding interconnection of the B-(signalizing) channels, whereby only that receive time slot for data sent by the authentication device 5 is mixed in the local node 4 with a send time slot for data for the user telephone 1, in which no authentication signals were received. This might possibly mean that no receive time slot at all for data sent by the authentication device 5 is mixed in the local node 4 with a send time slot for data for the user telephone 1. Thus, the reply of the authentication device 5 only reaches the database 2 or its upstream voice dialog system 2a. In other words: The data flows 6e and 6f sent by the database 2 or its upstream voice dialog system 2a over the local node 4 to the user telephone 1 and, therefore, to the caller, do not contain any signals sent by the authentication device 5 and can, therefore, not be misused. These data are indicated in FIG. 2 by a white arrow 9 in which no authentication signals are contained any more.

Therefore, the system can be operated like a conference circuit of three participants, in which critical data are only transmitted by a first participant to a firmly specified second participant. The replies of the caller to requests of the voice dialog system ("Say after me . . . ") are immediately recorded and analyzed by the authentication device 5. The communication between the authentication device and the voice dialog system is effected over DTMF and is not heard by the caller, because these sound sequences are filtered out.

Over an application programming interface (API), the voice dialog system 2a of the database 2 is informed of a positive authentication. In the embodiment according to the invention, the application does not require any data connection to the authentication device 5.

In addition to the communication via DTMF sequences, an evaluation of the voice (voice recognition) in the authentication device 5 is also possible. In this case, no adaptations of the authentication system are necessary. The voice recognition has in this case a 100% hit rate because the text sequences are firmly programmed in the authentication system. An announcement of a successful authentication can be recognized by the remote authentication.

With that, the invention offers the advantage that the communication between an authentication system and a voice dialog system can be realized without requiring the use of an interface other than the telephone interface. The authentication device 5 can be situated at any location with network connection.

In the description, it was assumed so far that the authentication signals are separated from the signals destined for the user, in the local node 4. It is, however, evident for the person skilled in the art that this is only an example and that these signals may also be separated in the access control properly speaking, i.e. an ISDN card or the interactive voice dialog system 2a.

Furthermore, the method according to the invention is not limited to one authentication attempt, but several attempts can be admitted, in which, if necessary, an averaging of the individual results can be effected. In other words: A voice sample is recorded which comprises at least one sequence of several syllables or words, i.e. the user is requested several times (as standard or as a function of the preceding authentication results) to pronounce a word and/or a syllable, a voice sample being recorded in each case. Each of the individual voice samples is compared with a comparative data record, and a total hit rate is determined, i.e. a quotient of the successful attempts and the total number of attempts. Access to the desired information through the user is then released or denied by the access control 2a as a function of the hit rate.

In order to avoid, as far as possible, misses due to line troubles, preferably a voice filtering device (not shown) is used to eliminate troubles in the telephone line.

REFERENCE NUMBERS

1 User telephone, 1a User
2 Database, 2a Access control, in particular interactive voice system
3 Telecommunication network
4 Local node
5 Authentication device
6 Entering circuit, 6a-6f Data flows
7 Identification signal sent by the user
8 Comparative result sent by the authentication device
9 Authentication result sent by the access control of the database

The invention claimed is:

1. A method for authorizing access to a database by a user in a telecommunication network, said method comprising the steps of:
   connecting a user interface, an access control for the database and an authentication device with each other through a local node in the telecommunication network;
   requesting by the access control that the user provide a voice sample,
   comparing the voice sample with a comparative data record, wherein the comparative data record is assigned to the user, and wherein the comparative data record is stored in data storage by the authentication device,
   releasing or denying access by the user to desired information by the access control as a function of the result of the comparison,
   wherein the result of the comparison is output by the authentication device over the local node to the access control,
   wherein the result of the comparison is communicated by the access control to the user over the local node,
   wherein signals sent by the authentication device are masked out of the signals sent by the access control of the database to the user interface;
   wherein the telecommunication network is an Integrated Services Digital Network (ISDN); and
   wherein B-channels of the ISDN network are interconnected in such a way that only a respective receive time slot for signals sent by the authentication device is mixed in the local node with a send time slot for signals sent to a user telephone, in which no authentication signals were received.

2. The method of claim 1, wherein the comparative result is transmitted by Dual-tone multi-frequency signaling (DTMF) sequences between the authentication device and the access control.

3. The method of claim 1, wherein the voice sample comprises at least one sequence of several syllables or words, the user being requested several times to pronounce at least one of a word or a syllable, a voice sample being recorded each time,
   each of the several voice samples is compared with a comparative data record, whereby a hit rate is determined, and
   the access to the desired information by the user is at least one of released or denied by the access control as a function of the determined hit rate.

4. The method of claim 1, wherein a voice filtering device is used for eliminating noise in a telephone line.

5. The method of claim 1, wherein the masking of signals sent by the authentication device out of the signals sent by the access control for the user is effected in the local node.

6. The method according to claim 5, wherein the local node comprises a voice filtering device for eliminating noise in a telephone line.

7. The method of claim 1, wherein the access control is an interactive voice dialog system.

8. The method of claim 1, wherein the local node is an ISDN local node in which the B-channels are interconnected in such a way that; only the respective receive time slot for data sent by the authentication device is mixed with a send time slot for data for the user telephone, in which no authentication signals were received.

9. The method of claim 1, wherein the voice sample is a selected set of at least one of syllables, words, sentences, or numbers, and wherein the comparative data record is a voiced version of the same selected set of syllables, words, sentences, or numbers.

10. The method of claim 1, wherein data flows among the user interface, access control, and authentication device are configured so that at least selected portions of a reply of the authentication system are received exclusively by the access control and not by the user interface.

11. The method of claim 10, wherein the reply of the authentication system and the result communicated by the access control to the user are at least one of in different forms or employ differing alphabets.

12. A system for authorizing access to a database by a user in a telecommunication network, said telecommunication network comprising:
   a telephone user interface of a selected user,
   an authentication device, wherein the authentication device compares voice samples from users with comparative data records assigned to the users; and
   an access control for the database, the access control requesting the selected user to provide a voice sample to the authentication device, the voice sample received from the selected user, and releasing or denying access by the selected user to the desired information, as a function of a result of a comparison by the authentication device, wherein:
   the result of the comparison is output by the authentication device to the access control,
   the result of the comparison is thereafter communicated by the access control to the selected user, wherein signals sent by the authentication device are masked out of signals sent by the access control of the database to the user telephone interface;
   wherein the telecommunication network is an Integrated Services Digital Network (ISDN); and
   wherein B-channels of the ISDN network are interconnected in such a way that only a respective receive time slot for signals sent by the authentication device is mixed in the local node with a send time slot for signals sent to a user telephone, in which no authentication signals were received.

13. The system of claim 12, wherein the result of the comparison is transmitted by Dual-tone multi-frequency signaling (DTMF) sequences between the authentication device and the access control, wherein the voice sample comprises at least one sequence of several syllables or words, the selected user being requested several times to pronounce a word or a syllable, a voice sample being recorded each time, and wherein:
  each of the several syllables or words of the voice sample is compared with a comparative data record, whereby a hit rate is determined, and
  the access to the desired information by the user is at least one of released or denied by the access control as a function of the determined hit rate.

14. The system of claim 12, wherein a voice filtering device is used for eliminating troubles in the telephone line.

15. The system of claim 12, wherein the masking of signals sent by the authentication device out of the signals sent by the access control for the selected user is effected in a local node.

* * * * *

UNITED STATES PATENT AND TRADEMARK OFFICE
CERTIFICATE OF CORRECTION

PATENT NO. : 8,171,305 B2
APPLICATION NO. : 11/569508
DATED : May 1, 2012
INVENTOR(S) : Klaus-Dieter Menk and Axel Mayer It is certified that error appears in the above-identified patent and that said Letters Patent is hereby corrected as shown below:

At Column 8, line 16, after the word "that" please delete ";" therein.

Signed and Sealed this
First Day of January, 2013

David J. Kappos
*Director of the United States Patent and Trademark Office*